United States Patent
Kitayama et al.

(10) Patent No.: US 12,391,599 B2
(45) Date of Patent: Aug. 19, 2025

(54) GLASS COMPOSITION FOR CHEMICAL STRENGTHENING AND CHEMICALLY STRENGTHENED GLASS ARTICLE

(71) Applicant: Nippon Sheet Glass Company, Limited, Tokyo (JP)

(72) Inventors: Akira Kitayama, Osaka (JP); Junji Kurachi, Hyogo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 297 days.

(21) Appl. No.: 18/001,665

(22) PCT Filed: Jun. 30, 2021

(86) PCT No.: PCT/JP2021/024819
§ 371 (c)(1),
(2) Date: Dec. 13, 2022

(87) PCT Pub. No.: WO2022/004809
PCT Pub. Date: Jan. 6, 2022

(65) Prior Publication Data
US 2023/0373844 A1    Nov. 23, 2023

(30) Foreign Application Priority Data

Jun. 30, 2020    (JP) ................. 2020-112982

(51) Int. Cl.
| | | |
|---|---|---|
| *B32B 15/04* | (2006.01) | |
| *B32B 17/06* | (2006.01) | |
| *C03C 3/087* | (2006.01) | |
| *C03C 21/00* | (2006.01) | |

(52) U.S. Cl.
CPC ............ *C03C 3/087* (2013.01); *C03C 21/002* (2013.01)

(58) Field of Classification Search
CPC .................................................. C03C 21/002
USPC .................................................. 428/410, 426
See application file for complete search history.

(56) References Cited

U.S. PATENT DOCUMENTS

| | | | | |
|---|---|---|---|---|
| 9,060,435 | B2* | 6/2015 | Akiba ................. | H05K 5/03 |
| 9,764,980 | B2* | 9/2017 | Senshu .............. | C03C 21/002 |
| 2009/0298669 | A1* | 12/2009 | Akiba ................ | C03C 3/087 |
| | | | | 501/69 |
| 2012/0171497 | A1* | 7/2012 | Koyama ........... | C03C 3/085 |
| | | | | 428/428 |
| 2013/0011650 | A1* | 1/2013 | Akiba ................ | C03C 3/087 |
| | | | | 428/428 |
| 2013/0017380 | A1* | 1/2013 | Murata .............. | C03C 3/085 |
| | | | | 428/218 |
| 2016/0023945 | A1 | 1/2016 | Suzuki et al. | |
| 2016/0214885 | A1* | 7/2016 | Senshu ............. | C03C 21/002 |
| 2017/0029316 | A1* | 2/2017 | Shimada ........... | C03C 4/082 |
| 2017/0107141 | A1* | 4/2017 | Miyasaka .......... | C03C 3/087 |
| 2017/0121220 | A1* | 5/2017 | Miyasaka .......... | C03C 3/091 |
| 2017/0174565 | A1 | 6/2017 | Kase et al. | |

FOREIGN PATENT DOCUMENTS

| | | |
|---|---|---|
| JP | 2017014066 A | 1/2017 |
| JP | 2017078011 A | 4/2017 |
| JP | 2017114718 A | 6/2017 |
| JP | 2018203616 A | 12/2018 |
| WO | 2014104302 A1 | 7/2014 |
| WO | 2015163411 A1 | 10/2015 |
| WO | 2015199150 A1 | 12/2015 |
| WO | 2016002888 A1 | 1/2016 |
| WO | 2016006538 A1 | 1/2016 |

OTHER PUBLICATIONS

JP2017078011 English machine translation, Apr. 27, 2017.*
Extended European Search Report issued for European Patent Application No. 21832585.0, dated Jun. 14, 2024, 5 pages.
International Search Report and Written Opinion issued for International Patent Application No. PCT/JP2021/024819, Date of mailing: Aug. 10, 2021, 11 pages including English translation of Search Report.

* cited by examiner

Primary Examiner — Lauren R Colgan
(74) Attorney, Agent, or Firm — HSML P.C.

(57) ABSTRACT

The present disclosure provides a glass composition for chemical strengthening, the glass composition having a high alkali resistance and being suitable for achieving both the surface compressive stress and the compressive stress layer depth. The glass composition according to the present disclosure includes, as components, in mol %: 60 to 80% $SiO_2$; 1 to 5% $Al_2O_3$; 5 to 25% MgO; 0 to 5% CaO; 10 to 20% $Na_2O$; and 0 to 10% $K_2O$. A chemically strengthened glass article, for example, having a surface compressive stress of 650 to 950 MPa and a compressive stress layer depth of 7 to 17 μm can be provided using the glass composition.

16 Claims, No Drawings

GLASS COMPOSITION FOR CHEMICAL STRENGTHENING AND CHEMICALLY STRENGTHENED GLASS ARTICLE

TECHNICAL FIELD

The present invention relates to a glass composition suitable for chemical strengthening and particularly relates to a glass composition suitable for cover glasses of displays. The present invention also relates to a chemically strengthened glass article formed from the glass composition, and even a mobile information device (such as a smartphone or a tablet) including the glass article, a digital signage including the glass article, an in-car display including the glass article, and a protective case including the glass article and protecting a mobile information device.

BACKGROUND ART

A great strength against bending and impact has been required of cover glasses of displays. One known means for achieving such a strength is to use, as a glass composition, an aluminosilicate glass composition including a large amount of $Al_2O_3$. However, the temperature needs to be higher than 1600° C. to melt known aluminosilicate glass compositions because of high viscosities of glass melts thereof, and thus it is difficult to employ a float process suitable for mass production of glass sheets. Moreover, the known aluminosilicate glass compositions have the following disadvantages: homogenization of the glass melts is difficult due to the high viscosities thereof, and that makes it hard to increase the yields of glass articles; a large amount of an expensive raw material is needed as a glass component; high-temperature operation that is necessary as described above requires a large amount of heating energy, which increases the cost. Patent Literature 1 discloses a glass composition for chemical strengthening that can be molten at a temperature lower than 1600° C.

CITATION LIST

Patent Literature

Patent Literature 1: WO 2016/002888 A1

SUMMARY OF INVENTION

Technical Problem

Commonly, chemically strengthened glass articles having a large compressive stress layer depth do not have a very large surface compressive stress, while chemically strengthened glass articles having a large surface compressive stress do not have a very large compressive stress layer depth. Alkali resistance is also an important property of glass compositions for chemical strengthening. However, alkali resistance is not discussed in Patent Literature 1.

It is accordingly an object of the present invention to provide a glass composition for chemical strengthening, the glass composition having a melting temperature lower than 1600° C., having a high alkali resistance, and being suitable for achieving both the surface compressive stress and the compressive stress layer depth in appropriate ranges. The present invention also aims to provide a chemically strengthened glass article achieving an appropriate balance between the surface compressive stress and the compressive stress layer depth.

Solution to Problem

As a result of energetic studies of the contents of components in a soda-lime silicate glass and the physical properties thereof, the present inventor has successfully achieved the above object.

The present invention provides a glass composition for chemical strengthening including, as components, in mol %:
60 to 80% $SiO_2$;
1 to 5% $Al_2O_3$;
0 to 13% MgO;
0 to 10% CaO;
10 to 20% $Na_2O$; and
0 to 10% $K_2O$.

The present invention further provides a chemically strengthened glass article including the glass composition for chemical strengthening, wherein
a surface compressive stress is 650 to 950 MPa or more, and
a compressive stress layer depth is 7 to 17 μm.

Advantageous Effects of Invention

According to the present invention, a glass composition for chemical strengthening can be provided, the glass composition having a high alkali resistance and being suitable for achieving both the surface compressive stress and the compressive stress layer depth in appropriate ranges. Moreover, according to the present invention, a chemically strengthened glass article achieving an appropriate balance between the surface compressive stress and the compressive stress layer depth can be provided.

DESCRIPTION OF EMBODIMENTS

Hereinafter, the symbol % used to indicate the contents of components of a glass composition is "mol %" unless otherwise specified. Preferred ranges of the contents of components, the sum totals of the components, ratios determined by given expressions, property values of glass, etc. can be obtained by combining any of preferred upper and lower limits individually described below. Hereinafter, for simplicity of description, the content of a component in mol % is sometimes expressed as [X]. The X represents a component forming a glass composition. Accordingly, for example, $[SiO_2]+[Al_2O_3]$ means the sum of the content of $SiO_2$ in mol % and the content of $Al_2O_3$ in mol %. $[R_2O]$ means the sum of $[Li_2O]$, $[Na_2O]$, and $[K_2O]$ ($[R_2O]=[Li_2O]+[Na_2O]+[K_2O]$), and [RO] means the sum of [MgO], [CaO], [SrO], and [BaO] ([RO]=[MgO]+[CaO]+[SrO]+[BaO]).

Hereinafter, the term "substantially free" is used to mean that the content of a component is limited to less than 0.1 mol %, preferably less than 0.07 mol %, and even more preferably less than 0.05 mol %. Industrially produced glass compositions often contain a small amount of impurities derived from, for example, an industrial raw material. The term "substantially" is used to mean that inevitable impurities are allowed to be contained as long as the upper limit of the content thereof is as described above. Additionally, the following description of embodiments of the present invention is not intended to limit the present invention to specific embodiments.

$SiO_2$ is a component forming a network structure of a glass. The content of $SiO_2$ is preferably 80% or less, 72% or less, 71% or less, or 70.5% or less, and may be, in some cases, 69.5% or less. The content of $SiO_2$ is preferably 60% or more, 63% or more, or 65% or more, and may be, in some cases, 66% or more, or even 68% or more. Too high a content of $SiO_2$ increases the viscosity of the glass, greatly increases a temperature T2 at which the viscosity is $10^2$ dPa·s, and decreases the meltability of the glass. On the other hand, too low a content of $SiO_2$ causes devitrification of the glass and decreases the weather resistance.

$Al_2O_3$ is a component that increases ion exchange performance of the glass, improves the alkali resistance of the glass, and improves the surface compressive stress achieved after chemical strengthening. Too high a content of $Al_2O_3$ increases the viscosity and devitrification temperature of the glass and decreases the meltability thereof. On the other hand, too low a content of $Al_2O_3$ greatly decreases the alkali resistance of the glass and makes it impossible to obtain a high surface compressive stress after chemical strengthening. The content of $Al_2O_3$ is preferably 5% or less, 4.9% or less, or 4.5% or less, and may be, in some cases, 4% or less. The content of $Al_2O_3$ is preferably 1% or more, 1.5% or more, or 2% or more.

A molar ratio $[Al_2O_3]/([SiO_2]+[Al_2O_3])$ is a parameter affecting the resistance to hydrofluoric acid. When this ratio is large, the resistance to hydrofluoric acid tends to decrease. When this ratio is too small, on the other hand, the viscosity tends to increase. From this point of view, $[Al_2O_3]/([SiO_2]+[Al_2O_3])$ is preferably 0.028 or more, 0.03 or more, or particularly 0.032 or more, and may be, in some cases, 0.04 or more. $[Al_2O_3]/([SiO_2]+[Al_2O_3])$ is preferably 0.055 or less, 0.052 or less, or particularly 0.05 or less.

MgO is a component that makes devitrification of the glass less likely. However, too high a content of MgO is likely to cause devitrification of the glass. On the other hand, too low a content of MgO decreases the chemical resistance, such as the acid resistance and the alkali resistance, of the glass and the water resistance of the glass. The content of MgO is preferably 0% or more, 4% or more, 6.5% or more, or particularly 7% or more. The content of MgO is preferably 13% or less, 12% or less, 10% or less, or particularly 8% or less.

CaO is a component that makes devitrification of the glass less likely. However, too high a content of CaO causes a decreasing effect on the surface compressive stress achieved after chemical strengthening. Moreover, too high a content of CaO is likely to cause devitrification and decreases the surface compressive stress achieved after chemical strengthening. On the other hand, too low a content of CaO decreases the alkali resistance of the glass. The content of CaO is preferably 0% or more, 3% or more, or 4% or more, and may be 5% or more. The content of CaO is preferably 10% or less, 8% or less, 7% or less, or particularly 6% or less.

When $([MgO]+[CaO]+[SrO]+[BaO]+[ZnO])$ is 10% or more, the meltability of the glass melt tends to be high. $([MgO]+[CaO]+[SrO]+[BaO]+[ZnO])$ is more preferably 10.5% or more, or 12% or more. On the other hand, too high $([MgO]+[CaO]+[SrO]+[BaO]+[ZnO])$ is likely to cause devitrification of the glass. The preferred range thereof is 14% or less.

Furthermore, when $([MgO]+[CaO])$ is 10% or more, or even 10.5% or more, the chemical resistance, such as the alkali resistance, of the glass melt is likely to be high. $([MgO]+[CaO])$ is more preferably 12% or more. On the other hand, too high $([MgO]+[CaO])$ is likely to cause devitrification of the glass. The preferred range thereof is 16% or less, 15% or less, or even 14% or less.

When a molar ratio $[MgO]/([CaO]+[MgO])$ is more than 0.5, the compressive stress layer depth after chemical strengthening can be increased. This effect is suitably exhibited when the molar ratio $[MgO]/([CaO]+[MgO])$ is 0.55 or more, particularly 0.58 or more. On the other hand, too large a molar ratio $[MgO]/([CaO]+[MgO])$ excessively increases the compressive stress layer depth after chemical strengthening and decreases the alkali resistance of the glass composition. The molar ratio $[MgO]/([CaO]+[MgO])$ is preferably 1 or less, particularly 0.97 or less, 0.9 or less, 0.8 or less, 0.75 or less, or particularly 0.7 or less. The molar ratio $[MgO]/([CaO]+[MgO])$ of the glass composition of the present embodiment can be more than 0.5, and the content of CaO can be 4.5% or more, or even 5% or more in the glass composition of the present embodiment. Preferred ranges of the molar ratio $[MgO]/[RO]$ are the same as those described for the molar ratio $[MgO]/([CaO]+[MgO])$.

$Na_2O$ is a component that decreases the viscosity of the glass and suppresses devitrification. However, too high a content of $Na_2O$ excessively decreases the water resistance of the glass. On the other hand, too low a content of $Na_2O$ increases the viscosity of the glass and decreases the meltability thereof. The content of $Na_2O$ is preferably 10% or more, 11% or more, 13% or more, or particularly 14% or more. The content of $Na_2O$ is preferably 20% or less, 19% or less, 18% or less, or particularly 16% or less.

$K_2O$ is an optional component that suppresses devitrification when added in a small amount. However, too high a content of $K_2O$ cannot achieve a desirable surface compressive stress after chemical strengthening. The content of $K_2O$ may be 0% or more, 0.05% or more, 0.2% or more, particularly 0.5% or more, or, in some cases, 0.7% or more. The content of $K_2O$ may be 10% or less, 2% or less, 1.3% or less, or, in some cases, 1.1% or less.

$Li_2O$ is an optional component, and may be added in an amount of 1% or less, or even 0.5% or less. The glass composition may be substantially free of $Li_2O$.

Too small a molar ratio $[Na_2O]/([Na_2O]+[K_2O])$ unnecessarily decreases the viscosity of the glass melt and severely deteriorates a molten salt in which the glass is immersed for chemical strengthening. Consequently, the performance in producing a chemically strengthened glass article decreases, and the manufacturing cost increases. Therefore, the ratio is preferably 0.5 or more, particularly 0.75 or more, and may be, in some cases, 0.9 or more, or 0.92 or more. On the other hand, too large a molar ratio $[Na_2O]/([Na_2O]+[K_2O])$ may decrease the surface compressive stress achieved after chemical strengthening. Therefore, the ratio is preferably 1 or less, or 0.99 or less, or, in some cases, 0.97 or less.

ZnO is an optional component improving the meltability of the glass. However, in the case of production by a float process, too high a content of ZnO causes reduction in a float bath and a product defect. The content of ZnO may be 0% or more, 0.01% or more, or 0.03% or more. The content of ZnO is preferably 1% or less, 0.6% or less, or 0.5% or less. The glass composition may be substantially free of ZnO.

SrO and BaO remarkably prevent sodium ion movement in the glass, greatly decrease the surface compressive stress achieved after chemical strengthening, and greatly reduce the compressive stress layer depth. Therefore, the glass composition is preferably substantially free of SrO and BaO.

$P_2O_5$ and $B_2O_3$ are optional components that accelerate melting of raw materials. However, these components facilitate erosion of a refractory material of a melting furnace, and condensate on the furnace wall after volatilization and then sometimes enter the glass melt as foreign matters. The glass composition is preferably substantially free of $P_2O_5$ and $B_2O_3$.

It is known that addition of a sulfuric acid salt as a part of a raw material promotes refining. When a sulfuric acid salt is added, $SO_3$ generated from the sulfuric acid salt is often left in the glass. $SO_3$ is an optional component, and the glass composition may be substantially free of $SO_3$. The content of $SO_3$ is preferably 0.5% or less, or 0.3% or less.

Examples of other optional components that can exert the refining effect include $As_2O_5$, $Sb_2O_5$, F, and Cl. However, these components have a major effect on the environment. When the glass composition includes F, the content of F is preferably 0.1% or less, 0.06% or less, or 0.05% or less, and the glass composition is more preferably substantially free of F. The glass composition is preferably substantially free of $As_2O_5$, $Sb_2O_5$, and Cl.

Iron oxide is an optional component serving as a colorant, and is also a typical impurity inevitably introduced from an industrial raw material of glass. Iron oxide is present in the glass composition as a divalent oxide (FeO) or a trivalent oxide ($Fe_2O_3$). When the glass composition is used for a cover glass of a display, the content of $Fe_2O_3$ is preferably low because coloring should not stand out. The content [T-$Fe_2O_3$] of iron oxide calculated in terms of a trivalent oxide is preferably 0.5% or less, 0.3% or less, or 0.2% or less. When coloring is particularly strictly avoided, the content [T-$Fe_2O_3$] of iron oxide calculated in terms of a trivalent oxide is preferably 0.02% or less, or 0.01% or less.

The glass composition of the present embodiment can contain an optional component other than the above, but it is preferred that the glass composition be substantially free of an optional component other than the above.

The glass composition of the present embodiment can have a low density. A glass sheet formed from a glass composition having a low density contributes to reduction of the weight of a product including the glass sheet.

In a preferred embodiment, the properties, specifically the elastic modulus, the density, and the temperature properties, that the glass composition according to the present invention can have are as follows.

A Young's modulus is preferably 65 GPa or more, or even 69 GPa or more. The Young's modulus may be 75 GPa or less. The density is preferably 2.5 g/cm$^3$ or less, 2.49 g/cm$^3$ or less, or even 2.48 g/cm$^3$ or less. The specific elastic modulus is preferably $27 \times 10^6$ Nm/kg or more, $28 \times 10^6$ Nm/kg or more, or $29 \times 10^6$ Nm/kg or more. The specific elastic modulus may be $31 \times 10^6$ Nm/kg or less. The specific elastic modulus is a value calculated by dividing the Young's modulus by the density. Such a high specific elastic modulus as described above is advantageous in terms of reducing deflection of a product including a glass sheet formed from the glass composition.

From the viewpoint of the density and the specific elastic modulus, a preferred embodiment of the glass composition according to the present invention can have the following properties.

Density: 2.5 g/cm$^3$ or less; and specific elastic modulus: $28 \times 10^6$ Nm/kg or more, even more, density: 2.49 g/cm$^3$ or less; and specific elastic modulus: $29 \times 10^6$ Nm/kg or more.

A devitrification temperature TL is preferably 1120° C. or lower, or even 1000° C. or lower. A shaping temperature T4 is preferably 1150° C. or lower, and may be 1040° C. or higher. A difference ΔT (ΔT=T4−TL) determined by subtracting the devitrification temperature TL from the shaping temperature T4 is preferably 0° C. or more, more preferably 5° C. or more, even more preferably 10° C. or more, much more preferably 15° C. or more, particularly preferably 18° C. or more, and may be 25° C. or more. Here, the shaping temperature T4 is a temperature at which the viscosity measured by a platinum ball-drawing method is $10^4$ dPa·s. The devitrification temperature TL is the highest temperature at which devitrification is observed in glass taken out of a temperature-gradient electric furnace, the glass being obtained by holding a crushed glass specimen in the furnace for 2 hours. In a preferred embodiment, the glass according to the present invention can have a low devitrification temperature as described above and a positive difference ΔT. The glass composition having a difference ΔT of 0° C. or more is suitable for production by the float process.

The temperature T2, at which the viscosity is $10^2$ dPa·s, of the glass composition of the present embodiment is preferably 1550° C. or lower, or even 1500° C. or lower. The glass-transition point Tg may be 510 to 600° C., or even 540 to 590° C. Too high Tg increases the difficulty of producing a glass sheet particularly by the float process. On the other hand, too low Tg tends to increase stress relaxation during chemical strengthening and decrease the surface compressive stress achieved after chemical strengthening.

A preferred linear thermal expansion coefficient is $70 \times 10^{-7}$ to $100 \times 10^{-7}$/° C., or even $90 \times 10^{-7}$ to $130 \times 10^{-7}$/° C. Here, the linear thermal expansion coefficient refers to the average linear thermal expansion coefficient in the temperature range of 50 to 350° C. The linear thermal expansion coefficient value is larger than that of common soda-lime glass used, for example, for windows of buildings and vehicles. A large linear thermal expansion coefficient has a shortening effect on the time required for chemical strengthening and a detachment prevention effect exhibited when a glass article formed from the glass composition of the present invention is adhered to a member formed of a metal or a plastic.

The glass composition of the present embodiment is suitable for mass production by the float process. By the float process, a glass sheet called float glass is produced from the glass composition according to the present invention. As is well known, the float process includes: melting glass raw materials in a melting furnace; and introducing the molten glass raw materials into a float bath to shape the molten glass raw materials into a glass sheet on molten tin in the float bath. In one embodiment of the present invention, float glass is produced by preparing glass raw materials such that a glass composition to be formed into a glass sheet has the above desirable composition. The float glass is shaped in a float bath with one principal surface in contact with molten tin, and the tin spreads over the principal surface. Accordingly, one principal surface, called a bottom surface, of the float glass has a surface layer formed of tin spread thereon. The other principal surface, called a top surface, does not have such a surface layer. From another perspective, in the float glass, the concentration of tin on one principal surface is higher than that on the other principal surface.

The glass composition of the present embodiment can have a high alkali resistance. Specifically, for the glass composition of the present embodiment, a weight loss by an alkali resistance test which is an elution test according to the Japan Optical Glass Industrial Standard JOGIS 06-1999 "Measurement Method (Powder Method) for Chemical Durability of Optical Glass" is 0.2% or less. The details of this elution test will be described in EXAMPLES.

The glass sheet may be formed of a chemically strengthened glass. As is well known, chemical strengthening is a treatment in which compressive stress is introduced in a surface of a glass by substituting alkali ions contained in the glass with other alkali ions having a larger ionic radius, for example, by substituting lithium ions with sodium ions or sodium ions with potassium ions.

Chemical strengthening of the glass sheet is performed by bringing the glass sheet into contact with a molten salt commonly including alkali ions. The molten salt is, for example, potassium nitrate or a salt mixture of potassium nitrate and sodium nitrate. When the molten salt used includes potassium nitrate alone, it is appropriate that the molten salt be at a temperature of about 460° C. to 500° C. in view of thermal decomposition of potassium nitrate and the thermal resistance of the glass. It is appropriate that the time during which the glass and the molten salt are in contact with each other be, for example, 4 hours to 12 hours.

The thus-obtained chemically strengthened glass article of the present embodiment can have an adequately high surface compressive stress and an adequately large compressive stress layer depth.

Specifically, the surface compressive stress is 650 to 950 MPa, and the compressive stress layer depth is 7 to 15 μm,
preferably, the surface compressive stress is 750 to 950 MPa and the compressive stress layer depth is 9 to 17 μm, and
even more preferably, the surface compressive stress is 800 to 950 MPa and the compressive stress layer depth is 10 to 17 μm.

Therefore, since the chemically strengthened glass article of the present embodiment has an adequately high surface compressive stress, a scratch is less likely to be made on a surface of the glass article. Additionally, since the compressive stress layer is adequately deep, a scratch on the surface is less likely to go deeper than the compressive stress layer and reach the inside of the glass article. In the chemically strengthened glass article of the present embodiment, CS and DOL can satisfy the following relations:

$$-0.04 \times CS + 41 \geq DOL - 0.04 \times CS + 48.6; \text{ and}$$

$$650 \leq CS \leq 950,$$

where CS represents the surface compressive stress in MPa and DOL represents the compressive stress layer depth in μm.

Generally, in a glass article including a compressive stress layer near a surface thereof, elastic energy caused by a compressive stress in the compressive stress layer is in a good balance with elastic energy caused by a tensile stress (internal tensile stress) occurring inside the glass article. Therefore, the internal tensile stress increases with decreasing thickness of the glass article even when the surface compressive stress and the compressive stress layer depth are constant. Such a glass article has a reduced strength, and is broken when an external force beyond the limit of the internal tensile stress is applied thereto.

The chemically strengthened glass article of the present embodiment has a high strength because the compressive stress layer depth is not too large at the same time and thus a value of the internal tensile stress is not too high.

The chemically strengthened glass article of the present embodiment, specifically a glass sheet, is particularly suitable as a cover glass of a display. The glass sheet according to the present invention can also be used in other applications such as a window glass of, for example, an automobile.

EXAMPLES

Hereinafter, the present invention will be described in more detail using specific examples. The examples given below are not intended to limit the present invention, either.

Batches were prepared to give compositions shown in Tables 1 to 3 using silica, alumina, sodium carbonate, magnesium oxide, calcium carbonate, potassium carbonate, etc. which are common glass raw materials. Each of the prepared batches was put in a platinum crucible, held at 1580° C. for 4 hours, and then poured onto an iron plate. This glass was held in an electric furnace at 650° C. for 30 minutes, after which the furnace was turned off to cool the glass to room temperature. A glass specimen was thus obtained. Properties of thus-obtained glass specimens were measured by the following methods. Tables 1 to 3 show the results. It should be added that Examples 21 to 35 are examples described in Patent Literature 1.

[Density ρ and Young's Modulus E]

Sheet-shaped samples having dimensions of 25×25×5 mm were fabricated by cutting the glass specimens and mirror-polishing every surface thereof. A density ρ of each sample was measured by Archimedes' principle. The Young's modulus of each sample was measured according to the ultrasonic pulse method in JIS R 1602-1995. Specifically, each sample used in the above density measurement was used to measure, for longitudinal and transverse waves, the sound speed at which an ultrasonic pulse propagated. The sound speeds and the above density were substituted in the formula defined in JIS R 1602-1995 to calculate a Young's modulus E. The propagation speeds were evaluated using an ultrasonic thickness gage MODEL 25DL PLUS manufactured by Olympus Corporation by dividing the time required by a 20 kHz ultrasonic pulse to propagate in the thickness direction of the sample, be reflected, and then come back by the propagation distance (twice the thickness of the sample).

[Glass-Transition Point Tg and Linear Thermal Expansion Coefficient α]

A cylindrical specimen having a diameter of 5 mm and a length of 18 mm was fabricated from each glass specimen. The cylindrical specimen was heated at 5° C./minute using a TMA apparatus to measure a thermal expansion curve. From this curve, the glass-transition point Tg and the average linear thermal expansion coefficient α in the temperature range of 50 to 350° C. were obtained.

[Measurement of Devitrification Temperature TL]

Each glass specimen was crushed into particles, which were sieved to obtain particles that pass through a sieve having an opening size of 2.83 mm and are left on a sieve having an opening size of 1.00 mm. These particles were washed to remove fine powder thereon, followed by drying to prepare a sample for devitrification temperature measurement. An amount of 25 g of the sample for devitrification temperature measurement was put in a platinum boat (a lidless rectangular platinum container) to have an approximately uniform thickness, held in a temperature-gradient furnace for 2 hours, and then taken out of the furnace. The highest temperature at which devitrification was observed in the glass was employed as the devitrification temperature TL of the sample.

[Measurement of Melting Temperature T2 and Shaping Temperature T4]

The viscosity was measured by a platinum ball-drawing method, and temperatures at which the thus-measured viscosity was $10^2$ dPa·s and $10^4$ dPa·s were respectively employed as the melting temperature T2 and the shaping temperature T4.

[Chemical Strengthening]

The chemical strengthening of a glass sheet was performed by bringing the glass sheet into contact with a molten salt commonly including alkali ions. Two sheet-shaped samples having dimensions of 25×25×0.7 mm were fabricated by cutting the glass specimen and mirror-polishing principal surfaces thereof. Potassium nitrate was used as the molten salt.

The chemical strengthening was performed under the following conditions.

Temperature of molten salt: 420° C.; duration of contact between glass and molten salt: 2 hours and 30 minutes, or 4 hours Temperature of molten salt: 400° C.; duration of contact between glass and molten salt: 4 hours

[Surface Compressive Stress CS and Compressive Stress Layer Depth DOL]

The surface compressive stress CS and the compressive stress layer depth DOL were measured for the chemically strengthened glass articles obtained in the above manner. A surface stress meter (SM-6000LE manufactured by Orihara Industrial Co., Ltd.) was used for the measurement. Specifically, the number of interference fringes and the intervals between the interference fringes were observed using the above surface stress meter, and the surface compressive stress CS and the compressive stress layer depth DOL were calculated using accompanying software. Not only the interference fringes but also a refractive index and a photoelastic constant are necessary for the calculation. The refractive index was defined as 1.511, and the photoelastic constant was determined by substituting the contents of the components in a known prediction equation (described in pp. 169-174 and 289-292 of M. B. Volf, (1988), "Mathematical Approach to Glass (Glass Science and Technology, Vol. 9)", Elsevier Science Ltd.).

In Tables 1 to 3, the content of a component X is simply expressed as "X" instead of [X], but the content of each component is in mol %.

[Alkali Resistance Test]

An alkali resistance test was performed on the basis of the elution test according to the Japan Optical Glass Industrial Standard JOGIS 06-1999 "Measurement Method (Powder Method) for Chemical Durability of Optical Glass". Specifically, the alkali resistance test was performed in the following manner. Each glass specimen was crushed into particles, which were sieved to obtain particles that pass through a sieve having an opening size of 600 μm and are left on a sieve having an opening size of 425 μm. These particles were washed with ethanol to remove fine powder thereon, followed by drying to prepare a sample for the alkali resistance test. An elution treatment was performed in which the sample for the alkali resistance test in an amount equivalent to the specific gravity [g] thereof was put in a platinum basket, immersed in 80 ml of an aqueous sodium hydroxide solution (concentration: 0.1 N) in a flask, and heated in a boiling water bath for one hour. The sample having undergone the elution treatment was washed with ethanol, dried at 120° C., and weighed. A weight loss rate [%] was then calculated.

In each of Examples 1 to 20,
the alkali resistance is less than 0.2%,
the surface compressive stress CS is 650 to 950 MPa,
the compressive stress layer depth DOL is 9 to 17 μm, and
the surface compressive stress CS in MPa and the compressive stress layer depth DOL in μm are in the following range:

$-0.04 \times CS + 41 \leq DOL \leq -0.04 \times CS + 48.6$.

On the other hand, in Examples 21 to 35,
the alkali resistance is 0.2% or more (Examples 21 to 25, 27, 28, 32, and 34), or
the following relational expression is not satisfied (Examples 26, 28 to 31, and 33 to 35):

$-0.04 \times CS + 41 \leq DOL \leq -0.04 \times CS + 48.6$.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| $SiO_2$ | mol % | 69.16 | 69.16 | 68.16 | 66.66 | 69.16 | 69.16 | 69.16 | 69.16 | 69.16 | 70.16 | 70.16 | 68.16 |
| $Al_2O_3$ |  | 2.50 | 2.50 | 3.50 | 3.50 | 2.50 | 2.50 | 2.50 | 2.00 | 2.00 | 2.00 | 2.50 | 2.50 |
| MgO |  | 7.60 | 7.60 | 7.60 | 7.60 | 7.60 | 7.10 | 7.10 | 7.85 | 7.85 | 7.60 | 7.60 | 7.60 |
| CaO |  | 5.52 | 5.52 | 5.52 | 5.52 | 5.52 | 5.02 | 5.02 | 5.77 | 5.77 | 5.52 | 5.52 | 5.52 |
| $ZrO_2$ |  | 0 | 0 | 0 | 0 | 0 | 0 | 0 | 0 | 0 | 0 | 0 | 0 |
| $Na_2O$ |  | 14.12 | 14.42 | 14.12 | 15.52 | 14.62 | 15.62 | 15.22 | 14.12 | 14.42 | 14.12 | 13.12 | 15.12 |
| $K_2O$ |  | 1.10 | 0.80 | 1.10 | 1.20 | 0.60 | 0.60 | 1.00 | 1.10 | 0.80 | 0.60 | 1.10 | 1.10 |
| $Fe_2O_3$ |  | 0.005 | 0.005 | 0.005 | 0.005 | 0.005 | 0.005 | 0.005 | 0.004 | 0.004 | 0.004 | 0.005 | 0.005 |
| RO |  | 13.12 | 13.12 | 13.12 | 13.12 | 13.12 | 12.12 | 12.12 | 13.62 | 13.62 | 13.12 | 13.12 | 13.12 |
| MgO/RO |  | 0.58 | 0.58 | 0.58 | 0.58 | 0.58 | 0.59 | 0.59 | 0.58 | 0.58 | 0.58 | 0.58 | 0.58 |
| $R_2O$ |  | 15.22 | 15.22 | 15.22 | 16.72 | 15.22 | 16.22 | 16.22 | 15.22 | 15.22 | 14.72 | 14.22 | 16.22 |
| $Na_2O/R_2O$ |  | 0.93 | 0.95 | 0.93 | 0.93 | 0.96 | 0.96 | 0.94 | 0.93 | 0.95 | 0.96 | 0.92 | 0.93 |
| $Al_2O_3/(SiO_2 + Al_2O_3)$ |  | 0.035 | 0.035 | 0.049 | 0.050 | 0.035 | 0.035 | 0.035 | 0.028 | 0.028 | 0.028 | 0.034 | 0.035 |
| Density g/cm³ |  | 2.484 | 2.485 | 2.487 | 2.497 | 2.484 | 2.482 | 2.482 | 2.487 | 2.486 | 2.477 | 2.475 | 2.492 |
| Young's modulus GPa |  | 72.6 | 72.7 | 73.2 | 73.1 | 72.4 | 72.0 | 71.9 | 72.5 | 72.6 | 72.4 | 73.0 | 72.7 |
| Specific elastic modulus $10^6$ Nm/kg |  | 29.2 | 29.3 | 29.4 | 29.3 | 29.1 | 29.0 | 29.0 | 29.2 | 29.2 | 29.2 | 29.5 | 29.2 |
| $T_2$ ° C. |  | 1470 | 1466 | 1478 | 1442 | 1463 | 1462 | 1468 | 1454 | 1450 | 1471 | 1494 | 1446 |
| $T_4$ ° C. |  | 1040 | 1038 | 1052 | 1023 | 1037 | 1029 | 1032 | 1027 | 1025 | 1041 | 1060 | 1020 |
| $T_L$ ° C. |  | 985 | 1004 | 1013 | 1001 | 1059 | 921 | 926 | 995 | 1011 | 1009 | 1010 | 969 |
| $T_4 - T_L$ ° C. |  | 55 | 34 | 40 | 22 | −22 | 108 | 106 | 33 | 14 | 31 | 51 | 51 |
| $\alpha\ 10^{-7}$ °C.$^{-1}$ |  | 92.3 | 92.1 | 92.5 | 97.9 | 92.0 | 95.0 | 96.4 | 94.1 | 94.0 | 90.6 | 88.1 | 96.9 |
| Tg ° C. |  | 555 | 556 | 564 | 551 | 556 | 550 | 544 | 552 | 553 | 553 | 563 | 551 |
| Alkali resistance wt % |  | 0.18 | 0.18 | 0.17 | 0.17 | 0.18 | 0.19 | 0.19 | 0.19 | 0.19 | 0.19 | 0.18 | 0.18 |
| Strengthening conditions |  | 420° C. 4 h | 420° C. 4 h | 420° C. 4 h | 420° C. 4 h | 420° C. 4 h | 420° C. 4 h | 420° C. 4 h | 420° C. 4 h | 420° C. 4 h | 420° C. 4 h | 420° C. 4 h | 420° C. 4 h |
| CS MPa |  | 831 | 841 | 854 | 803 | 825 | 773 | 776 | 801 | 801 | 810 | 816 | 799 |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| DOL μm | 13.8 | 13.6 | 13.7 | 15.7 | 12.9 | 15.6 | 16.2 | 13.5 | 13.1 | 12.8 | 12.5 | 14.6 |
| Strengthening conditions | 400° C. 4 h | 400° C. 4 h | 400° C. 4 h | 400° C. 4 h | 400° C. 4 h | 400° C. 4 h | 400° C. 4 h | 400° C. 4 h | 400° C. 4 h | 400° C. 4 h | 400° C. 4 h | 400° C. 4 h |
| CS MPa | 916 | 938 | 923 | 919 | 903 | 872 | 896 | 865 | 878 | 857 | 820 | 859 |
| DOL μm | 10.5 | 10.2 | 10.4 | 11.7 | 9.9 | 11.8 | 12.2 | 10.0 | 9.8 | 9.8 | 10.3 | 10.9 |

|  | Ex. 13 | Ex. 14 | Ex. 15 | Ex 16 | Ex 17 | Ex. 18 | Ex. 19 | Ex. 20 | Ex. 21 | Ex 22 | Ex. 23 | Ex. 24 |
|---|---|---|---|---|---|---|---|---|---|---|---|---|
| SiO$_2$ mol % | 70.16 | 69.66 | 70.16 | 68.68 | 70.22 | 68.16 | 69.16 | 70.96 | 67.20 | 66.90 | 66.90 | 66.90 |
| Al$_2$O$_3$ | 2.50 | 2.00 | 2.50 | 2.50 | 3.56 | 3.50 | 2.50 | 3.70 | 3.30 | 3.40 | 3.40 | 3.40 |
| MgO | 7.60 | 7.60 | 6.60 | 7.60 | 7.60 | 7.60 | 5.60 | 7.60 | 10.90 | 14.00 | 13.20 | 12.10 |
| CaO | 5.52 | 5.52 | 5.52 | 6.00 | 5.52 | 5.52 | 5.52 | 5.52 | 1.10 | 0.30 | 1.10 | 2.10 |
| ZrO$_2$ | 0 | 0 | 0 | 0 | 0 | 0 | 0 | 0 | 1.30 | 0 | 0 | 0 |
| Na$_2$O | 14.12 | 14.12 | 14.12 | 14.12 | 12.00 | 15.12 | 17.12 | 12.12 | 16.10 | 15.40 | 15.40 | 15.40 |
| K$_2$O | 0.10 | 1.10 | 1.10 | 1.10 | 1.10 | 0.10 | 0.10 | 0.10 | 0 | 0 | 0 | 0 |
| Fe$_2$O$_3$ | 0.004 | 0.004 | 0.005 | 0.005 | 0.005 | 0.005 | 0.005 | 0.005 | 0 | 0 | 0 | 0 |
| RO | 13.12 | 13.12 | 12.12 | 13.60 | 13.12 | 13.12 | 11.12 | 13.12 | 12.00 | 14.30 | 14.30 | 14.20 |
| MgO/RO | 0.58 | 0.58 | 0.54 | 0.56 | 0.58 | 0.58 | 0.50 | 0.58 | 0.91 | 0.98 | 0.92 | 0.85 |
| R$_2$O | 14.22 | 15.22 | 15.22 | 15.22 | 13.10 | 15.22 | 17.22 | 12.22 | 16.10 | 15.40 | 15.40 | 15.40 |
| Na$_2$O/R$_2$O | 0.99 | 0.93 | 0.93 | 0.93 | 0.92 | 0.99 | 0.99 | 0.99 | 1.00 | 1.00 | 1.00 | 1.00 |
| Al$_2$O$_3$/(SiO$_2$ + Al$_2$O$_3$) | 0.034 | 0.028 | 0.034 | 0.034 | 0.035 | 0.048 | 0.049 | 0.035 | 0.050 | 0.047 | 0.048 | 0.048 |
| Density g/cm$^3$ | 2.476 | 2.481 | 2.476 | 2.489 | 2.469 | 2.488 | 2.485 | 2.463 | 2.496 | 2.463 | 2.468 | 2.478 |
| Young's modulus GPa | 73.0 | 72.5 | 72.2 | 73.0 | 74.0 | 73.3 | 71.4 | 74.0 | — | — | — | — |
| Specific elastic modulus 10$^6$ Nm/kg | 29.5 | 29.2 | 29.1 | 29.3 | 30.0 | 29.5 | 28.7 | 30.0 | — | — | — | — |
| T$_2$ ° C. | 1481 | 1466 | 1487 | 1456 | 1530 | 1464 | 1442 | 1539 | 1501 | 1493 | 1492 | 1480 |
| T$_4$ ° C. | 1053 | 1034 | 1049 | 1032 | 1096 | 1046 | 1011 | 1109 | 1100 | 1081 | 1085 | 1069 |
| T$_L$ ° C. | 1023 | 976 | 935 | 963 | 1071 | 1018 | <813 | 1109 | 960 | 1120 | 1030 | 1040 |
| T$_4$-T$_L$ ° C. | 31 | 58 | 114 | 68 | 25 | 27 | >198 | 0 | >140 | −39 | 55 | 29 |
| α 10$^{-7}$° C.$^{-1}$ | 86.6 | 93.1 | 92.5 | 92.8 | 84.2 | 90.1 | 97.4 | 78.8 | 91.0 | 88.0 | 92.0 | 93.0 |
| Tg ° C. | 568 | 552 | 554 | 555 | 583 | 566 | 542 | 594 | 582 | 588 | 580 | 569 |
| Alkali resistance wt % | 0.18 | 0.19 | 0.18 | 0.17 | 0.17 | 0.17 | 0.18 | 0.16 | 0.27 | 0.29 | 0.27 | 0.24 |
| Strengthening conditions | 420° C. 4 h | 420° C. 4 h | 420° C. 4 h | 420° C. 4 h | 420° C. 4 h | 420° C. 4 h | 420° C. 4 h | 420° C. 4 h | 425° C. 2.5 h | 425° C. 2.5 h | 425° C. 2.5 h | 425° C. 2.5 h |
| CS MPa | 846 | 788 | 779 | 796 | 797 | 840 | 664 | 819 | 800 | 752 | 761 | 742 |
| DOL μm | 11.2 | 13.8 | 14.4 | 12.6 | 12.7 | 12.5 | 17.4 | 10.2 | 16.0 | 15.0 | 15.0 | 13.0 |
| Strengthening conditions | 400° C. 4 h | 400° C. 4 h | 400° C. 4 h | 400° C. 4 h | 400° C. 4 h | 400° C. 4 h | 400° C. 4 h | 400° C. 4 h | — | — | — | — |
| CS MPa | 869 | 852 | 822 | 861 | 812 | 947 | 809 | 853 | — | — | — | — |
| DOL μm | 9.0 | 10.5 | 11.7 | 10.1 | 9.6 | 9.2 | 12.1 | 7.6 | — | — | — | — |

TABLE 3

|  | Ex. 25 | Ex. 26 | Ex. 27 | Ex. 28 | Ex. 29 | Ex. 30 | Ex. 31 | Ex. 32 | Ex. 33 | Ex. 34 | Ex. 35 |
|---|---|---|---|---|---|---|---|---|---|---|---|
| SiO$_2$ mol % | 66.90 | 66.90 | 64.90 | 67.20 | 66.90 | 66.90 | 66.90 | 66.70 | 67.30 | 66.00 | 70.90 |
| Al$_2$O$_3$ | 3.40 | 3.40 | 3.10 | 2.50 | 3.40 | 3.40 | 3.40 | 0.60 | 3.80 | 4.70 | 1.10 |
| MgO | 11.40 | 10.00 | 13.90 | 11.30 | 5.70 | 3.60 | 0.00 | 13.20 | 6.00 | 8.40 | 6.70 |
| CaO | 2.90 | 4.30 | 1.10 | 4.00 | 8.60 | 10.70 | 14.30 | 1.10 | 8.50 | 2.80 | 8.30 |
| ZrO$_2$ | 0 | 0 | 0.90 | 0 | 0 | 0 | 0 | 0 | 0 | 2.00 | 0 |
| Na$_2$O | 15.40 | 15.40 | 16.10 | 14.30 | 15.40 | 15.40 | 15.40 | 15.30 | 12.10 | 15.80 | 12.70 |
| K$_2$O | 0 | 0 | 0 | 0.60 | 0 | 0 | 0 | 3.10 | 2.30 | 1.30 | 0.20 |
| Fe$_2$O$_3$ | 0 | 0 | 0 | 0 | 0 | 0 | 0 | 0 | 0 | 0 | 0 |
| RO | 14.30 | 14.30 | 15.00 | 15.30 | 14.30 | 14.30 | 14.30 | 14.30 | 14.50 | 11.20 | 15.00 |
| MgO/RO | 0.80 | 0.70 | 0.93 | 0.74 | 0.40 | 0.25 | 0.00 | 0.92 | 0.41 | 0.75 | 0.45 |
| R$_2$O | 15.40 | 15.40 | 16.10 | 14.90 | 15.40 | 15.40 | 15.40 | 18.40 | 14.40 | 17.10 | 12.90 |
| Na$_2$O/R$_2$O | 1.00 | 1.00 | 1.00 | 0.96 | 1.00 | 1.00 | 1.00 | 0.83 | 0.84 | 0.92 | 0.98 |
| Al$_2$O$_3$/(SiO$_2$ + Al$_2$O$_3$) | 0.048 | 0.048 | 0.046 | 0.036 | 0.048 | 0.048 | 0.048 | 0.009 | 0.053 | 0.066 | 0.015 |
| Density g/cm$^3$ | 2.482 | 2.490 | 2.506 | 2.491 | 2.521 | 2.531 | 2.550 | 2.478 | 2.523 | 2.512 | 2.492 |
| Young's modulus GPa | — | — | — | — | — | — | — | — | — | — | — |
| Specific elastic modulus 10$^6$ Nm/kg | — | — | — | — | — | — | — | — | — | — | — |
| T$_2$ ° C. | 1475 | 1464 | 1456 | 1453 | 1434 | 1419 | 1395 | 1370 | 1464 | 1496 | 1447 |
| T$_4$ ° C. | 1064 | 1055 | 1069 | 1050 | 1028 | 1015 | 993 | 978 | 1055 | 1086 | 1039 |
| T$_L$ ° C. | 1050 | 1080 | 1030 | 1060 | 1060 | 1080 | 1150 | <900 | 1050 | 970 | 1030 |

TABLE 3-continued

|  | Ex. 25 | Ex. 26 | Ex. 27 | Ex. 28 | Ex. 29 | Ex. 30 | Ex. 31 | Ex. 32 | Ex. 33 | Ex. 34 | Ex. 35 |
|---|---|---|---|---|---|---|---|---|---|---|---|
| $T_4\text{-}T_L$ °C. | 14 | −25 | 39 | −10 | −32 | −65 | −157 | >78 | 5 | 116 | 9 |
| $\alpha\ 10^{-7}$°C.$^{-1}$ | 92.0 | 93.0 | 91.0 | 92.0 | 97.0 | 94.0 | 100.0 | 114.0 | 98.0 | 101.0 | 88.0 |
| Tg °C. | 569 | 564 | 583 | 560 | 564 | 567 | 579 | 513 | 565 | 563 | 563 |
| Alkali resistance wt % | 0.22 | 0.19 | 0.27 | 0.21 | 0.12 | 0.10 | 0.07 | 0.34 | 0.12 | 0.20 | 0.16 |
| Strengthening conditions | 425° C. 2.5 h | 425° C. 2.5 h | 425° C. 2.5 h | 425° C. 2.5 h | 425° C. 2.5 h | 425° C. 2.5 h | 425° C. 2.5 h | 425° C. 2.5 h | 425° C. 2.5 h | 425° C. 2.5 h | 425° C. 2.5 h |
| CS MPa | 738 | 730 | 844 | 705 | 707 | 696 | 678 | 545 | 618 | 771 | 542 |
| DOL μm | 13.0 | 11.0 | 12.0 | 11.0 | 7.0 | 5.0 | 2.0 | 20.0 | 12.0 | 18.0 | 6.0 |

The invention claimed is:

1. A glass composition for chemical strengthening, comprising, as components, in mol %:
66 to 71% $SiO_2$;
1 to 5% $Al_2O_3$;
4 to 8% MgO;
4 to 6.00% CaO;
14 to 16% $Na_2O$; and
0.7 to 1.3% $K_2O$, wherein, in mol %,
MgO+CaO+SrO+BaO+ZnO is 10% or more and 14% or less,
a molar ratio MgO/(MgO+CaO) is 0.54 to 0.7, and
a molar ratio $Na_2O$/($Na_2O$+$K_2O$) is 0.9 to 0.97.

2. The glass composition for chemical strengthening according to claim 1, comprising, as components, in mol %:
66 to 71% $SiO_2$;
2 to 4% $Al_2O_3$;
4 to 8% MgO;
4 to 6.00% CaO;
14 to 16% $Na_2O$;
0.7 to 1.3% $K_2O$;
0 to 1% ZnO; and
0 to 1% $Fe_2O_3$, wherein, in mol %,
MgO+CaO+SrO+BaO+ZnO is 10% or more and 14% or less,
$Na_2O$+$K_2O$+$Li_2O$ is 18% or less,
a density is 2.50 g/cm$^3$ or less, and
a weight loss by an alkali resistance test is less than 0.2%.

3. The glass composition for chemical strengthening according to claim 2, comprising, as components, in mol %:
66 to 70.5% $SiO_2$;
2 to 4% $Al_2O_3$;
6.5 to 8% MgO;
4 to 6.00% CaO;
14 to 16% $Na_2O$;
0.7 to 1.3% $K_2O$;
0 to 1% ZnO; and
0 to 1% $Fe_2O_3$, wherein, in mol %,
MgO+CaO+SrO+BaO+ZnO is 10.5% or more and 14% or less, and
$Na_2O$+$K_2O$+$Li_2O$ is 17% or less.

4. The glass composition for chemical strengthening according to claim 3, comprising, as components, in mol %:
66 to 69.5% $SiO_2$;
2 to 4% $Al_2O_3$;
7 to 8% MgO;
5 to 6.00% CaO;
14 to 16% $Na_2O$;
0.7 to 1.3% $K_2O$;
0 to 1% ZnO; and
0 to 1% $Fe_2O_3$, wherein, in mol %,
MgO+CaO+SrO+BaO+ZnO is 12% or more and 14% or less, and $Na_2O$+$K_2O$+$Li_2O$ is 17% or less.

5. The glass composition for chemical strengthening according to claim 1, being substantially free of SrO and BaO.

6. The glass composition for chemical strengthening according to claim 1, wherein, in mol %, MgO+CaO is 10.5 to 15%.

7. The glass composition for chemical strengthening according to claim 1, wherein a molar ratio $Al_2O_3$/($SiO_2$+$Al_2O_3$) is 0.028 to 0.055.

8. The glass composition for chemical strengthening according to claim 1, wherein
a Young's modulus is 71.9 to 75 GPa, and
a specific elastic modulus is 27×10$^6$ to 31×10$^6$ Nm/kg.

9. The glass composition for chemical strengthening according to claim 1, wherein a temperature T2 at which a viscosity is 10$^2$ dPa·s is 1550° C. or lower.

10. The glass composition for chemical strengthening according to claim 1, wherein
a temperature T4 at which a viscosity is 10$^4$ dPa·s is 1150° C. or lower,
a devitrification temperature TL is 1013° C. or lower, and
T4-TL is 0° C. or more.

11. The glass composition for chemical strengthening according to claim 1, wherein an average thermal expansion coefficient between 50 to 350° C. is 92.1×10$^{-7}$ to 100×10$^{-7}$°C.$^{-1}$.

12. The glass composition for chemical strengthening according to claim 1, wherein a glass-transition point Tg is 551 to 600° C.

13. A chemically strengthened glass article, comprising the glass composition for chemical strengthening according to claim 1, wherein
a surface compressive stress is 650 to 950 MPa or more, and
a compressive stress layer depth is 9 to 17 μm.

14. The chemically strengthened glass article according to claim 13, wherein
the surface compressive stress is 750 to 950 MPa, and
the compressive stress layer depth is 9 to 17 μm.

15. The chemically strengthened glass article according to claim 14, wherein
the surface compressive stress is 800 to 950 MPa, and
the compressive stress layer depth is 10 to 17 μm.

16. The chemically strengthened glass article according to claim 13, wherein CS and DOL satisfy the following relational expressions:

$$-0.04 \times CS + 41 \leq DOL \leq -0.04 \times CS + 48.6;\text{ and}$$

$$650 \leq CS \leq 950,$$

where CS represents the surface compressive stress in MPa and DOL represents the compressive stress layer depth in μm.

* * * * *